United States Patent
Sittu

[11] Patent Number: 5,975,558
[45] Date of Patent: Nov. 2, 1999

[54] ADJUSTABLE SHADE FOR A STROLLER

[76] Inventor: John D. Sittu, 7247 E. Starla Dr., Scottsdale, Ariz. 85255

[21] Appl. No.: 09/003,426

[22] Filed: Jan. 6, 1998

[51] Int. Cl.[6] ...................................................... B62B 1/00
[52] U.S. Cl. ...................... 280/647; 280/47.38; 280/650; 280/644; 296/77.1
[58] Field of Search ................................ 280/47.38, 650, 280/644, 647; 296/77.1, 97.21, 107.2, 79

[56] References Cited

U.S. PATENT DOCUMENTS

| | | | |
|---|---|---|---|
| D. 319,202 | 8/1991 | Reinhart | D12/133 |
| 1,339,527 | 5/1920 | Sperling | 296/77.1 |
| 2,789,863 | 4/1957 | Shimabukurg | 296/77.1 |
| 3,834,756 | 9/1974 | Grell | 296/78 |
| 4,120,118 | 10/1978 | Mathews et al. | 46/201 |
| 4,533,170 | 8/1985 | Banks et al. | 296/78 A |
| 4,582,355 | 4/1986 | Hall | 296/78 |
| 4,641,879 | 2/1987 | Kassai | 296/77.1 |
| 5,121,940 | 6/1992 | March | 280/644 |
| 5,184,865 | 2/1993 | Mohtasham et al. | 296/77.1 |
| 5,277,213 | 1/1994 | Mitchell | 135/88 |
| 5,460,395 | 10/1995 | Chen | 280/47.38 |
| 5,542,732 | 8/1996 | Pollman | 296/77.1 |
| 5,849,402 | 12/1998 | Kraemling et al. | 296/77.1 |

*Primary Examiner*—J. J. Swann
*Assistant Examiner*—James S. McClellan
*Attorney, Agent, or Firm*—Meschkow & Gresham, P.L.C.; Jordan M. Meschkow; Lowell W. Gresham

[57] ABSTRACT

An adjustable shade (20) is used in combination with a stroller (22) carrying a child occupant. The stroller (22) has an integral canopy (26), and the adjustable shade (20) includes a top cover (36) which is configured to attach to the integral canopy (26). A front curtain (38) is coupled to the top cover (36) and extends downward from a front edge (52) of the top cover (36). First and second side curtains (40, 42) are coupled to the top cover (36) and extend downward from first and second lateral edges (54, 56) of the top cover (36). Adjustable shade (20) adjusts to a plurality of positions to effectively protect the child occupant from lateral and reflected rays of sunlight.

16 Claims, 4 Drawing Sheets

ADJUSTABLE SHADE FOR A STROLLER

TECHNICAL FIELD OF THE INVENTION

The present invention relates in general to an apparatus for protecting children from the rays of the sun, and more particularly, to an adjustable shade for use with a stroller.

BACKGROUND OF THE INVENTION

As is well known in the art, various problems and difficulties have been encountered in providing suitable sun shade devices for protecting infants and children when they are exposed to the sun. This is particularly true when an infant or young child occupies a baby carriage, stroller, or other conveyance device. Suitable sun shade devices are very important to the well-being of the child because sunlight can cause skin damage to the child or make the child occupant uncomfortable from the intense light and heat. Furthermore, when an infant is secured in a reclining or near-reclining position, the rays of the sunlight will often fall directly upon the infants' face and eyes causing damage to the eyes.

Many conventional conveyance devices, termed strollers herein, have integral canopies which are configured to protect a child occupant. While these canopies may protect the child from vertical rays of sunlight, these canopies are ineffective for protecting the child occupant from lateral and reflected rays of sunlight. Moreover, as the stroller moves around, the lateral and reflected rays of sunlight come in different directions according to the direction in which the stroller travels, making it difficult for an adult to effectively protect the child by using temporary means, such as strategically placed blankets or other shields.

One conventional baby carriage hood, or sun shade, has a support member for mounting the hood on a stroller. The support member includes a shaft which extends through the support member. The hood also has at least two hood ribs whose ends are bunched by the shaft in the manner of the pivot of a hand-held foldable fan. The ribs can then be unfolded and folded in the manner of a fan, and the unfolded angle thereof can be adjusted to any desired angle so as to shade the child occupant. Unfortunately, this sun shade does not completely enclose the child occupant of the stroller, hence the lateral and reflected rays of sunlight will still reach the child as the stroller travels about. Moreover, the attachment of the support member to a stroller precludes this prior art sun shade from being used on a variety of strollers.

Another prior art sun shade includes a self supporting frame for supporting a protective cover to protect a child occupant against the sunlight. The self supporting frame is secured to the handles of a conventional stroller and to structural elements of the stroller chassis. The self supporting frame then retains the protective cover around the chassis of the stroller to effectively protect the child occupant regardless of which direction the stroller travels.

Unfortunately, the self supporting frame structure is cumbersome to install, awkward to store, and does not allow quick and immediate access to the child occupant should the need arise. Another problem with the self supporting frame structure sun shade is that the child occupant is completely enclosed in a visually limiting protective cover. A child often feels separated or abandoned by his or her adult companion, for example his parent, if the child does not have an unimpeded view of that parent. This situation causes feelings of unhappiness or fear which leads to a fretful, crying baby or child. Moreover, the protective cover may also limit fresh air from passing through the stroller, so that the air under the cover is hot and stale. This situation results in further unhappiness for the child occupant due to the discomfort of the heat.

Yet another prior art sun shade is formed from a foldable material such as cardboard, plastic, and the like. The material is cut and scored to provided a preselected pattern which when folded into its fully assembled configuration, provides a means for attachment to a stroller for blocking sunlight. The canopy is configured to be installed at a position above and separated from a child in the stroller so that it allows quick and immediate access to the child occupant should the need arise. Unfortunately, this sun shade also does not completely enclose the child occupant of the stroller, hence the lateral and reflected rays of sunlight will still reach the child as the stroller travels about.

SUMMARY OF THE INVENTION

Accordingly, an advantage of the present invention is that an adjustable shade is provided for effectively shielding a child occupant from lateral and reflected rays of sunlight.

Another advantage of the present invention is that an adjustable shade is provided that is adaptable to a variety of strollers.

Another advantage of the present invention is that an adjustable shade is provided that is conveniently installed and rapidly deployed.

Another advantage of the present invention is that an adjustable shade is provided that allows for quick and immediate access to the child occupant of a stroller.

Yet another advantage of the present invention is that an adjustable shade is provided that allows a child occupant of a stroller to have a partially unimpeded view of the environment outside the stroller.

The above and other advantages of the present invention are carried out in one form by an adjustable shade for use on a stroller having an integral canopy. The shade includes a top cover configured to attach to the integral canopy. A front curtain is coupled to the top cover and extends downward from a front edge of the top cover. A first side curtain is coupled to the top cover and extends downward from a first lateral edge of the top cover. A second side curtain is coupled to the top cover and extends downward from a second lateral edge of the top cover.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
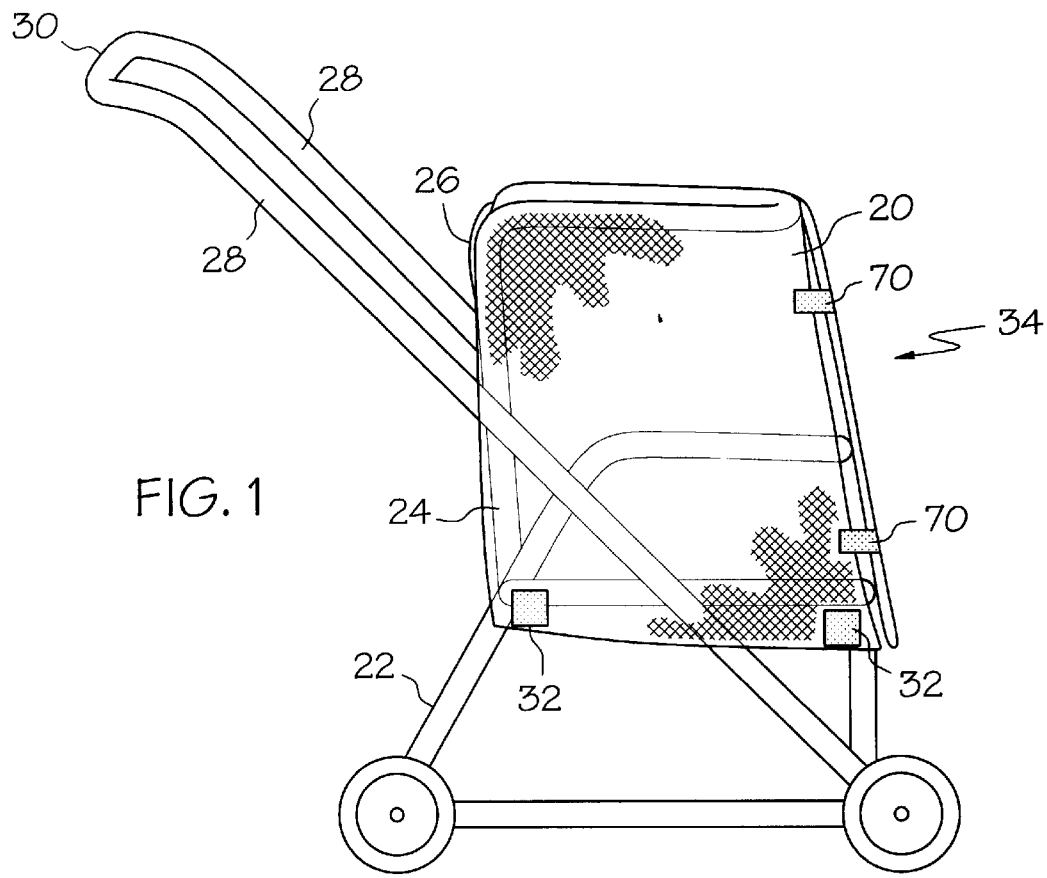
FIG. 1 shows a side view of an adjustable shade used in combination with a stroller.

FIG. 1 shows a side view of an adjustable shade 20 used in combination with a stroller 22. Stroller 22 has a chassis 24 in which an infant or young child, termed child occupant herein (not shown), is conveyed. An integral canopy 26 couples to chassis 24 and is spaced above the seat of chassis 24 to partially shield the child occupant from overhead rays of sunlight. Stroller 22 also includes a pair of spaced tubular members 28 that merge into a handle 30 for pushing stroller 22. Those skilled in the art will recognize that there are many different styles of strollers, and stroller 22 is described herein to clarify the discussion of adjustable shade 20.

Adjustable shade 20 couples to integral canopy 26 and is configured to extend downward from integral canopy 26 and attach to chassis 24 at fasteners 32 to establish a fully deployed configuration 34. Fasteners 32 are represented as dashed lines herein to show their location between adjustable shade 20 and chassis 24. Fully deployed configuration 34 results in adjustable shade 20 surrounding the sides and front of stroller 22 to effectively shield the child occupant from vertical, lateral, and reflected rays of sunlight.

Those skilled in the art will recognize that with the appropriate selection of materials, adjustable shade 20 may also be configured to shield the child occupant from rain, wind, snow, or other environmental factors. Furthermore, since adjustable shade 20 fully surrounds the child occupant when in fully deployed configuration 34, shade 20 may alternatively be used to shield the child occupant from stinging or biting insects.

Figure 2:
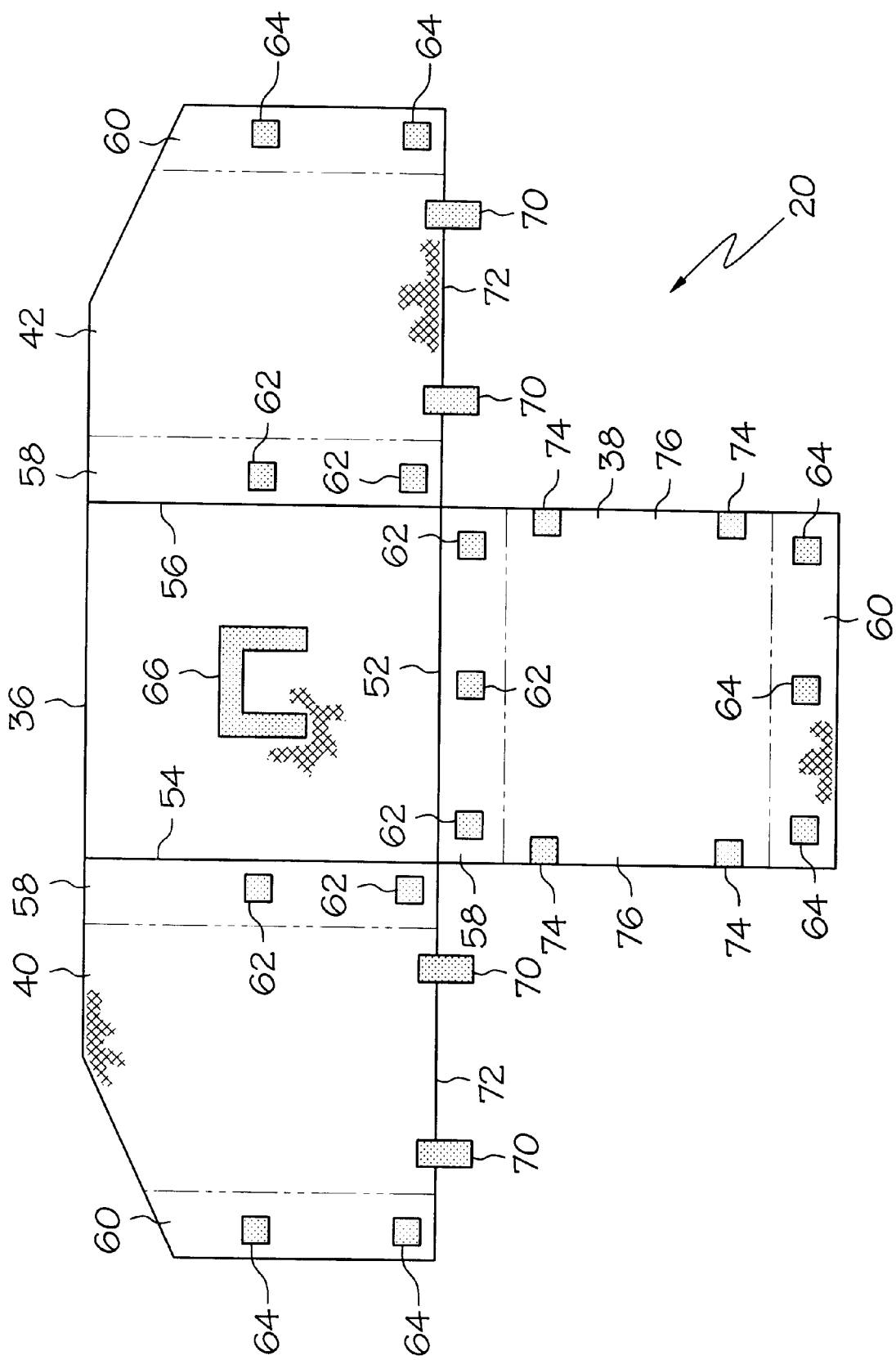
FIG. 2 shows a top view of the adjustable shade separated from the stroller.
Figure 3:
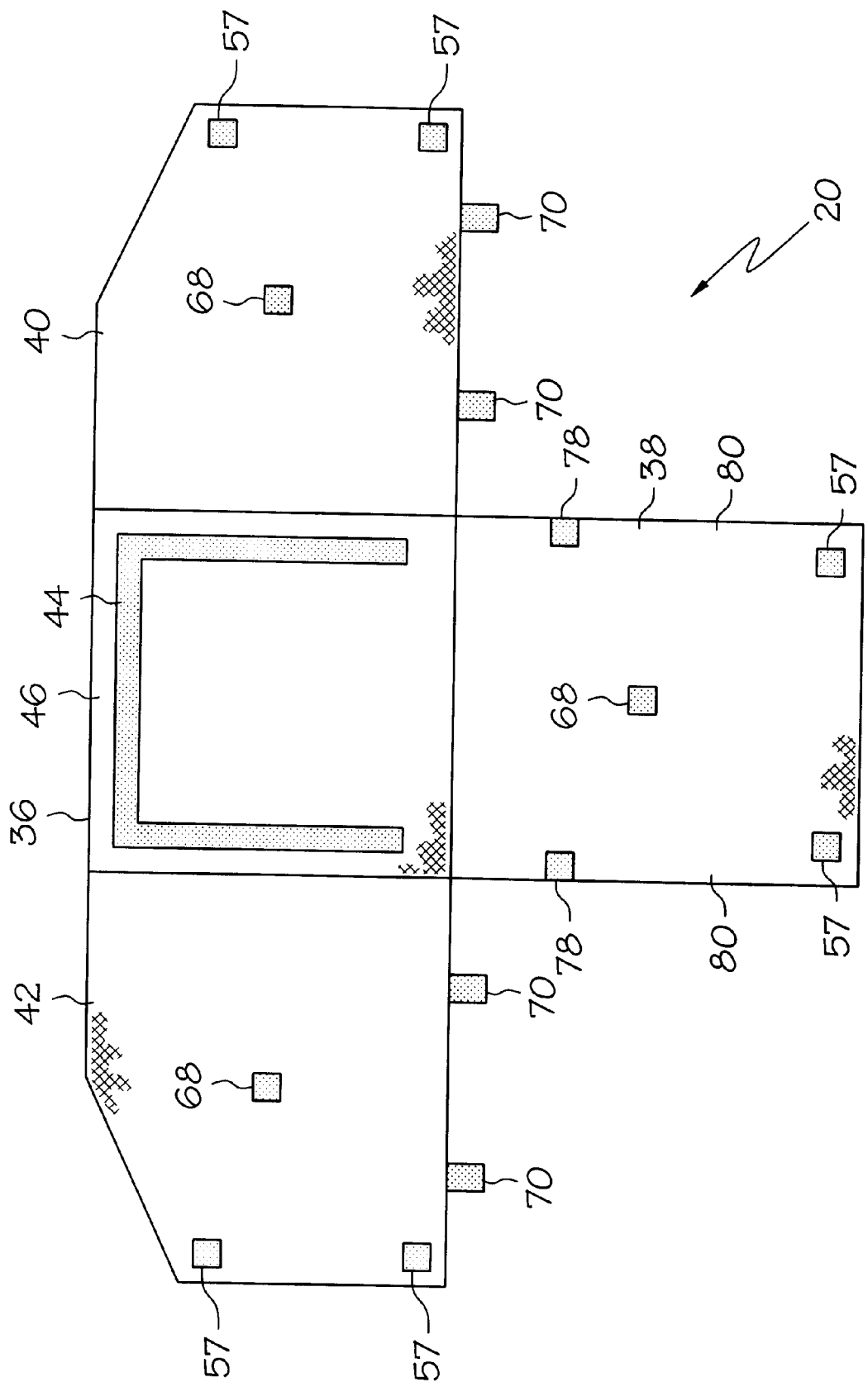
FIG. 3 shows a bottom view of the adjustable shade separated from the stroller.
Figure 4:
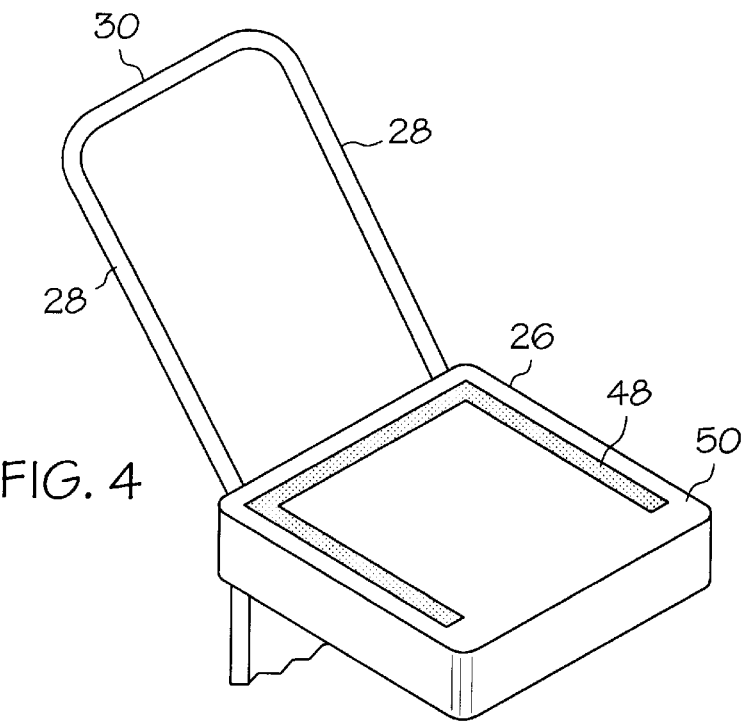
FIG. 4 shows a perspective view of an integral canopy of the stroller.

With reference to FIGS. 2–4, FIG. 2 shows a top view of adjustable shade 20 separated from stroller 22 (FIG. 1). Likewise, FIG. 3 shows a bottom view of adjustable shade 20 separated from stroller 22. FIG. 4 shows a perspective view of integral canopy 26 of the stroller 20. Adjustable shade 20 includes a top cover 36, a front curtain 38, a first side curtain 40, and a second side curtain 42. In the preferred embodiment, adjustable shade 20 is formed from a single piece of flexible material configured to effectively block ultraviolet radiation from the sun.

Top cover 36 includes a hook fastener 44 coupled to and inner surface 46. Additionally, integral canopy 26 includes a loop fastener 48 coupled to a top surface 50. Thus, hook fastener 44 and loop fastener 48 are configured to engage one another in order to attach top cover 36 to integral canopy 26. In addition, hook fastener 44 and loop fastener 48 are formed from the same color of material. The color-coded hook and loop fasteners provide a means of installing adjustable shade 20 rapidly and easily.

Front curtain 38 is coupled to a front edge 52 of top cover 36 and extends downward from front edge 52 to chassis 24 (FIG. 1). Likewise, first side curtain 40 is coupled to a first lateral edge 54 of top cover 36, and second side curtain 42 is coupled to a second lateral edge 56 of top cover 36. First and second side curtains 40 and 42, respectively, also extend downward from first and second lateral edges 54 and 56, respectively, to chassis 24.

Front, first side, and second side curtains 38, 40, and 42, respectively, may also include hook fasteners 57 for affixing curtains 38, 40, and 42 to corresponding fasteners 32 (FIG. 1) located in positions on chassis 24. Hook fasteners 57 hold curtains 38, 40, and 42 to chassis 24, in a manner such that fasteners 57 are readily disengaged from their respective fasteners 32, should the parent desire rapid access to the child occupant of stroller 22.

In addition, first and second side curtains 40 and 42, respectively, are shaped to avoid interference with tubular members 28 (FIG. 1). The shape of first and second side curtains 40 and 42 varies to accommodate differing styles of strollers so as to not interfere with the tubular members, handles, locks, or any other stroller components that are desirably accessed once adjustable shade 20 is in fully deployed configuration 34 (FIG. 1).

With particular reference to FIG. 2, front curtain 38, first side curtain 40, and second side curtain 42 each have a top portion 58 and a bottom portion 60. Top portion 58 of front curtain 38 is located proximate front edge 52 of top cover 36. Likewise, top portion 58 of first side curtain 40 is located proximate first lateral edge 54 of top cover 36, and top portion 58 of second side curtain 42 is located proximate second lateral edge 56 of top cover 36. Bottom portion 60 of front, first side, and second side curtains 38, 40, and 42, respectively is proximate the portion of curtains 38, 40, and 42 that attaches to chassis 24 (FIG. 1). Top and bottom portions 58 and 60, respectively, are not separate elements, instead they serve to identify a location on curtains 38, 40, and 42 in order to clarify the following description.

A hook fastener 62 is coupled to top portion 58 and a loop fastener 64 is coupled to bottom portion 60. Each of front, first side, and second side curtains 38, 40, and 42, respectively, is configured to fold such that hook and loop fasteners 62 and 64, respectively, are engaged forming a first adjustment means in order to establish a partially deployed configuration (discussed below).

Top cover 36 includes a loop fastener 66. Referring momentarily to FIG. 3, each of front, first side, and second side curtains 38, 40, and 42, respectively, has a hook fastener 68. Front, first side, and second side curtains 38, 40, and 42, respectively, are further configured to fold such that loop fastener 66 and hook fastener 68 are engaged forming a second adjustment means in order establish a minimally deployed configuration (discussed below).

Hook fastener 62 and loop fastener 64 are formed from a first color of material. Likewise, loop fastener 66 and hook fastener 68 are formed from a second color of material, the second color being different from the first color. The color-coded hook and loop fasteners provides guidance in adjusting front, first side and second side curtains 38, 40, and 42, rapidly and easily.

Each of first and second side curtains 40 and 42, respectively, includes tabs 70, formed from hook fastener. Tabs 70 extend from a forward edge 72 of first and second side curtains 40 and 42 to engage to corresponding first loop receivers 74. First loop receivers 74 are positioned at an outer portion 76 of front curtain 38. Tabs 70 engage with first loop receivers 74 to attach first and second side curtains 40 and 42, respectively, to front curtain 38 when adjustable shade 20 is in fully deployed configuration 34 (FIG. 1)

In addition to first loop receivers 74, second loop receivers 78 (FIG. 3) are positioned at an inner portion 80 of front curtain 38. Tabs 70 are further configured to engage with second loop receivers 78 to attach first and second side curtains 40 and 42, respectively, to front curtain 38 when adjustable shade 20 is in the partially deployed configuration (discussed below).

In the preferred embodiment, hook and loop fasteners are utilized because of their ease of use and rapid deployment. However, it should be apparent to those skilled in the art that the hook and loop fasteners described herein, such as fasteners 32, hook fastener 44, loop fastener 48, hook fastener 57, hook fastener 62, loop fastener 64, loop fastener 66, hook fastener 68, tabs 70, first loop receivers 74, and second loop receivers 78, need not be hook and loop. Rather, these fasteners could be any type or combination of conventional fasteners, such as snaps, buckles, buttons, and so forth. In addition, the arrangement and number of the hook and loop fasteners may differ from that which has been described in order to adapt to differing styles of strollers.

Figure 5:
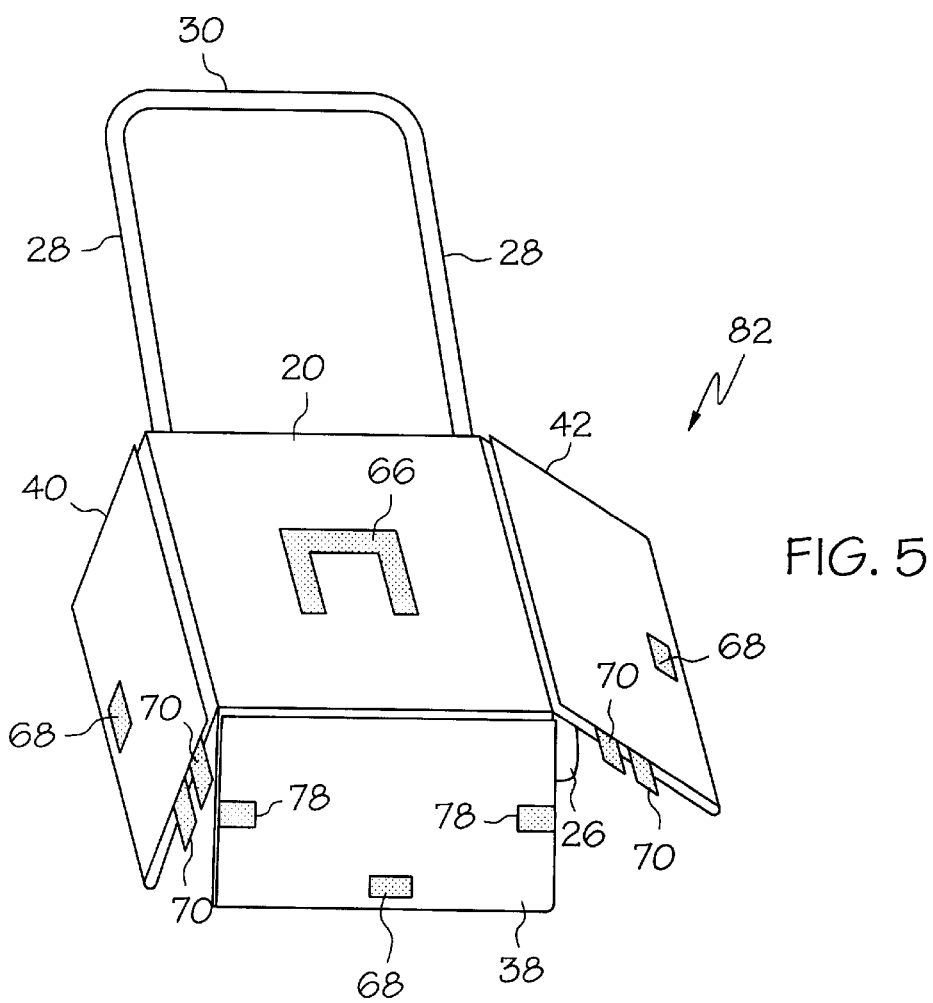
FIG. 5 shows a perspective view of the adjustable shade in a partially deployed configuration and attached to the integral canopy of the stroller.

FIG. 5 shows a perspective view of adjustable shade 20 in a partially deployed configuration 82 and attached to integral canopy 26 of stroller 22. To establish partially deployed configuration 82, each of front curtain 38, first side curtain 40, and second side curtain 42 has been folded so that loop fasteners 64 (FIG. 2) are engaged with hook fasteners 62 (FIG. 2). Tabs 70 can then be engaged with second loop receivers 78 to attach first and second side curtains 40 and 42, respectively, to front curtain 38.

The effect of folding each of front, first side, and second side curtains 38, 40, and 42, respectively, is to shorten each of the curtains to approximately one half of their originally length. Thus, partially deployed configuration 82 effectively blocks some of the lateral and reflected rays of sunlight while allowing the child occupant of stroller 22 a partially unimpeded view of the environment outside of stroller 22. In the case of a young child or a non-sleeping infant, this may reduce the childs' anxiety at not being able to see his or her parent. Furthermore, partially deployed configuration 82 allows a breeze to blow through the space encircled by adjustable shade 20 keeping the child occupant of stroller 22 cooler.

Figure 6:
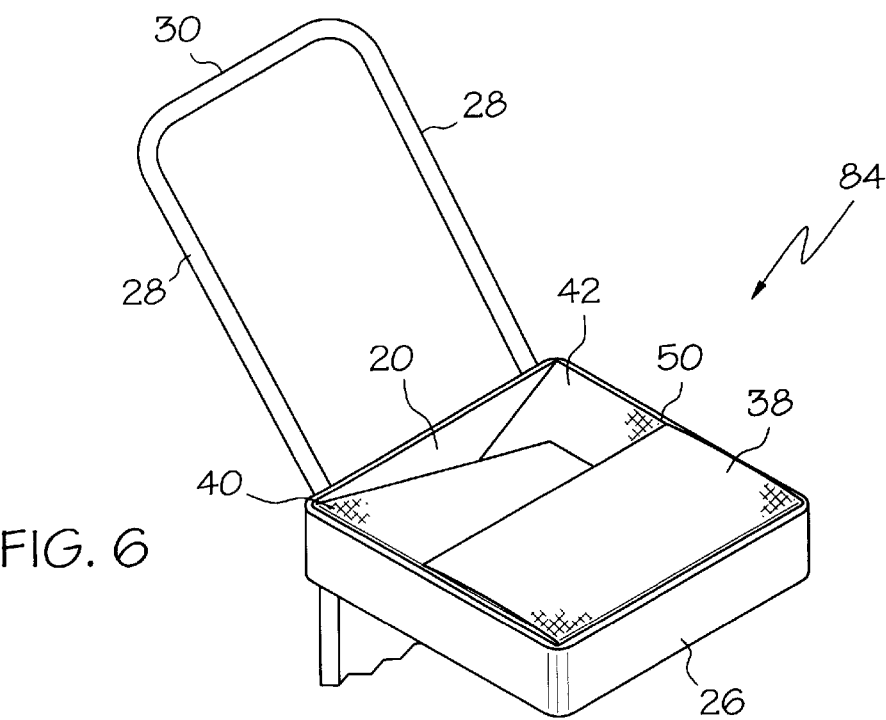
FIG. 6 shows a perspective view of the adjustable shade in a minimally deployed configuration and attached to the integral canopy of the stroller.

FIG. 6 shows a perspective view of adjustable shade 20 in a minimally deployed configuration 84 and attached to integral canopy 26 of stroller 22. To establish minimally deployed configuration 84, each of front curtain 38, first side curtain 40, and second side curtain 42 has been folded so that loop fasteners 68 (FIG. 3), which were exposed when shade 20 was placed in partially deployed configuration 82 (FIG. 5), are engaged with loop fastener 66 (FIG. 2).

The effect of folding each of front, first side, and second side curtains 38, 40, and 42, respectively, to minimally deployed configuration 84 is to cause adjustable shade 20 to rest on top of integral cover 26 where shade 20 can be out of the way, yet easily deployed as desired.

It should be readily apparent from the description of partially and minimally deployed configurations 82 and 84, respectively, that each of front, first side, and second side curtains 38, 40, and 42 may be adjusted separately to establish the most appropriate type shielding. For example, front curtain 38 may be folded to minimally deployed configuration 84, while first and second side curtains remain in partially deployed configuration 82. This configuration would allow the child occupant a partially unimpeded view of the external environment while providing effective shielding from sunlight.

When adjustable shade 20 is not needed, shade 20 may be detached from integral canopy 26. Due to the flexibility of shade 20, it may then be folded at least once more into a stowed position. Shade 20 may then be placed in a pouch or carrying case.

In an alternate embodiment of the present invention, adjustable shade 20 may be integrally formed as part of stroller 22. In such an embodiment, integral cover 26 of stroller 22 would not exist. Rather, top cover 36 (FIG. 2) of adjustable shade 20 would affix to directly to a portion of stroller 22, such as tubular members 28 (FIG. 1).

In another alternate embodiment of the present invention, adjustable shade 20, loop fastener 48 (FIG. 4), and fasteners 32 (FIG. 1) may be combined to form a shade adapter kit. In such a combination, a user attaches fasteners 32 and loop fastener 48 to appropriate desired positions on a pre-existing stroller. Adjustable shade 20 is then attached to an integral canopy of the stroller via fastener 48 and shade 20 is deployed to shield a child occupant of the stroller from lateral and reflected rays of sunlight.

In summary the present invention provides an adjustable shade that effectively shields a child occupant from lateral and reflected rays of sunlight. The adjustable shade is adaptable to a variety of strollers and is conveniently installed and rapidly deployed using hook and loop fasteners. Furthermore, the hook and loop fastener configuration allows for quick and immediate access to the child occupant of a stroller and the curtain arrangement allows a child occupant of a stroller to have a partially unimpeded view of the environment outside the stroller.

Although the preferred embodiments of the invention have been illustrated and described in detail, it will be readily apparent to those skilled in the art that various modifications may be made therein without departing from the spirit of the invention or from the scope of the appended claims. For example, other materials may be used for the adjustable shade that provide shielding from wind, snow, rain, or insects. Furthermore, other conventional fasteners may be used such as snaps, hooks, buttons, or any combination thereof.

What is claimed is:

1. An adjustable shade to be used in combination with a stroller, said stroller having an integral canopy, and said shade comprising:

a top cover configured to attach to said integral canopy;

a front curtain coupled to said top cover and extending downward from a front edge of said top cover;

a first side curtain coupled to said top cover and extending downward from a first lateral edge of said top cover; and a second side curtain coupled to said top cover and extending downward from a second lateral edge of said top cover, wherein each of said front, first side, and second side curtains includes means for adjusting said shade to a partially deployed configuration.

2. An adjustable shade as claimed in claim 1 wherein:

said integral canopy includes a loop fastener coupled to a top surface of said integral canopy; and said top cover includes a hook fastener coupled to an inner surface of said top cover, said loop and hook fasteners being configured to engage one another.

3. An adjustable shade as claimed in claim 2 wherein said loop and hook fasteners are formed from materials of substantially the same color.

4. An adjustable shade as claimed in claim 1 wherein said front, first side, and second side curtains serve to substantially shield a child occupant of said stroller from lateral and reflected rays of sunlight when said curtains are in a fully deployed configuration.

5. An adjustable shade as claimed in claim 1 wherein each of said front, first side, and second side curtains has a top portion and a bottom portion, and said adjusting means comprises:

a hook fastener coupled to said top portion;

a loop fastener coupled to said bottom portion; and each of said front, first side, and second side curtains is configured to fold such that said hook and loop fasteners are engaged to establish said partially deployed configuration.

6. An adjustable shade as claimed in claim 1 wherein said adjusting means is a first adjusting means, and each of said front, first side, and second side curtains includes a second means for adjusting said shade to a minimally deployed configuration.

7. An adjustable shade as claimed in claim 6 wherein:
said first adjusting means is color-coded using a first color; and
said second adjusting means is color-coded using a second color, said first and second colors being different.

8. An adjustable shade as claimed in claim 6 wherein:
said top cover includes a loop fastener;
said second adjusting means comprises a hook fastener; and
each of said front, first side, and second side curtains is configured to fold such that said loop and hook fasteners are engaged to establish said minimally deployed configuration.

9. An adjustable shade as claimed in claim 1 wherein each of said first and second side curtains include a means for attaching said first and second side curtains to said front curtain.

10. An adjustable shade as claimed in claim 9 wherein said attachment means is a tab formed from a hook fastener, said tab extending from a forward edge of one of said first and second side curtains, and said tab being configured to engage with a first loop receiver positioned at an outer portion of said front curtain.

11. An adjustable shade as claimed in claim 10 wherein
each of said front, first side, and second side curtains is configured to fold to establish said partially deployed configuration; and
said front curtain includes a second loop receiver positioned at an inner portion of said front curtain, and said tab is further configured to engage with said second loop receiver when said shade is in said partially deployed configuration.

12. An adjustable shade as claimed in claim 1 wherein said stroller has a pair of spaced tubular members merging into a handle for pushing said stroller and each of said first and second side curtains is shaped to avoid interference with said tubular members.

13. An adjustable shade as claimed in claim 1 wherein said shade is formed from a material configured to effectively block ultraviolet radiation from the sun.

14. An adjustable shade as claimed in claim 1 wherein said shade is formed from a flexible material configured to fold into a stowed position.

15. An adjustable shade to be used in combination with a stroller, said stroller having a chassis and a pair of spaced tubular members merging into a handle for pushing said stroller, said shade comprising:
a top cover coupled to said tubular members at a location above said chassis;
a front curtain coupled to a front edge of said top cover, said front curtain extending downward from said front edge to said chassis;
a first side curtain coupled to a first lateral edge of said top cover, said first side curtain extending downward from said first lateral edge to said chassis;
a second side curtain coupled to a second lateral edge of said top cover, said second side curtain extending downward from said second lateral edge to said chassis; and
each one of said front, first side, and second side curtains comprises:
a top portion located proximate said top cover;
a bottom portion located proximate said chassis;
means for fastening said one curtain to said chassis;
first means for adjusting said one curtain, said first adjusting means establishing a partially deployed configuration; and
second means for adjusting said one curtain, said second adjusting means establishing a minimally deployed configuration.

16. An adjustable sunshade as claimed in claim 15 wherein said shade is integrally formed as part of said stroller.

* * * * *